United States Patent [19]

Marason, Jr. et al.

[11] 4,128,949
[45] Dec. 12, 1978

[54] TOY CLOCK USING MARBLES

[75] Inventors: Gabriel Marason, Jr., Hawthorne; John M. Melzian, Palos Verdes; Alan R. Pitkanen, Manhattan Beach, all of Calif.

[73] Assignee: Mattel, Inc., Hawthorne, Calif.

[21] Appl. No.: 782,300

[22] Filed: Mar. 28, 1977

[51] Int. Cl.² .................................................. G09B 19/12
[52] U.S. Cl. .................................................. 35/39; 58/106
[58] Field of Search .................... 35/39; 46/42, 43; 58/106

[56] References Cited

U.S. PATENT DOCUMENTS

| | | | |
|---|---|---|---|
| 1,099,507 | 6/1914 | Marshall | 46/43 |
| 2,390,442 | 12/1945 | Larsen, Jr. | 46/42 |
| 2,539,025 | 1/1951 | Lobb | 35/39 |
| 2,651,851 | 9/1953 | Valpey | 35/39 UX |
| 2,728,150 | 12/1955 | O'Neil | 35/39 |
| 2,785,504 | 3/1957 | Koolstra, Sr. | 46/42 |
| 2,837,838 | 6/1958 | Lewis | 35/39 |
| 3,108,810 | 10/1963 | Wiley, Jr. | 46/42 X |
| 3,251,155 | 5/1966 | Bjork | 46/42 |
| 3,295,319 | 1/1967 | Nutting et al. | 35/39 X |
| 3,690,021 | 9/1972 | Glass et al. | 35/39 |

Primary Examiner—William H. Grieb
Attorney, Agent, or Firm—John G. Mesaros; Max E. Shirk; Stephen L. King

[57] ABSTRACT

A toy clock having a housing with a base portion for supporting the clock face thereof in a vertical position, the clock face having an hour hand and a minute hand proportionately coupled and rotatable, the rotatin thereof simultaneously effecting proportional rotation of a coaxial pair of co-planar disc surfaces to effect a digital readout corresponding to the position of the dials. The clock is provided with a rear compartment which houses a conveyor operated by rotation of the dials to elevate marbles from a given location to a marble storage rack in the upper rear portion in the housing. A tuned escapement or release mechanism permits a number of marbles, corresponding to the number indicated by the hour hand, to be released sequentially along a trackway viewable from the front, the track providing a path of travel for the marbles under the force of gravity with periodic interceptions by pivotally supported animated figures to the lower portion of the housing. The marbles are then returned through an aperture to the given location for raising by the conveyor.

18 Claims, 10 Drawing Figures

TOY CLOCK USING MARBLES

BACKGROUND OF THE INVENTION

The background of the invention will be discussed in two parts:

1. Field of the Invention

This invention relates to toy clocks and more particularly to a toy clock having educational value while providing amusement to a child.

2. Description of the Prior Art

Toy clocks for children are a source of amusement as well as a source of educational value when the toy clock enables a child to learn to tell time. One such prior toy clock incorporated a recording with means for driving the recording electrically to reproduce a sound indicating the time shown on the hands of the clock.

In other toy clocks the hour hand and minute hand would be proportionately coupled and rotatable to simulate movement corresponding to that of a real clock. However, without more, such a toy clock would have limited amusement value or educational value.

One attempt at providing amusement value to a toy clock is illustrated by toy clocks such as those shown in U.S. Pat. Nos. 3,295,312 and 3,690,021, the devices of both of these patents providing an audible signal corresponding to a time set on the face of the clock.

Clocks which have attempted to provide a digital readout of either the minute hand, the hour hand or both are illustrated in U.S. Pat. Nos. 2,539,025, 2,728,150 and 2,837,838.

Other prior art known to the applicant is listed by way of illustration, and not of limitation in a separate communication to the Patent Office.

Such prior art devices, although educational in form, are not readily suited to a child of very tender years due to the limited nature of the amusement value.

It is accordingly an object of this invention to provide a new and improved toy clock.

It is another object of this invention to provide a toy clock which provides a digital readout corresponding to the location of the hands of the clock and further provides animation.

It is a further object of this invention to provide a toy clock which releases a number of marbles corresponding to the hour indicated, the marbles operating under the force of gravity within a viewable compartment to enhance the amusement value.

It is a still further object of this invention to provide a new and improved toy clock using marbles traversing a trackway to pivot figures and to provide an audible signal corresponding to the hour.

SUMMARY OF THE INVENTION

The foregoing and other objects of the invention are accomplished by providing a toy clock having a housing with a base portion for supporting a surface having the clock face in a vertical position. The housing has a front viewable compartment with inclined track means for directing marbles into contact with pivotally mounted figures to provide animation and into contact with a bell adapted to emit an audible signal as each marble passes. The marbles are retained on a lower track which is provided with an aperture in communication with a rear compartment. Adjacent the aperture within the rear compartment is a conveyor operated by manual rotation of the clock hands to elevate all the marbles from the lower track in one complete revolution of the minute hand to a marble storage rack within the upper portion of the rear compartment. A marble selector belt coacts with the marble storage rack and is operable by rotation of the clock hands to pre-select a number of marbles for release equal to the number indicated by the hour hand. The marbles are released sequentially by an escapement mechanism through the front compartment through an aperture.

Other objects, features and advantages of the invention will become apparent upon a reading of the specification when taken in conjunction with the drawings in which like reference numerals refer to like elements in the several views.

BRIEF DESCRIPTION OF THE DRAWINGS

FIGS. 9 and 10 are partial views of the release escapement mechanism of FIG. 7 illustrating the marble release function.

DESCRIPTION OF THE PREFERRED EMBODIMENT

Figure 1:
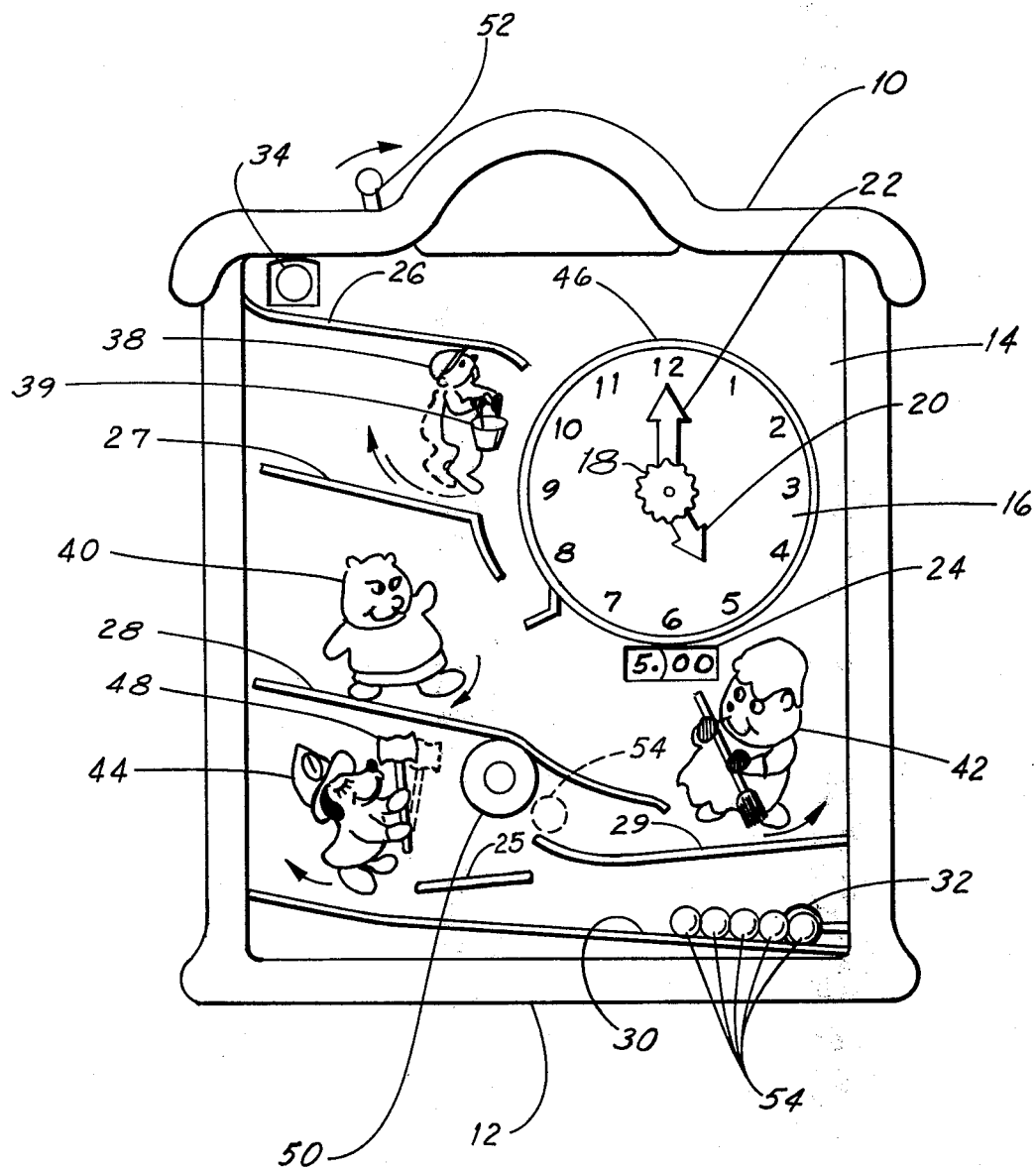
FIG. 1 is a front view of a toy clock according to the invention.

Referring now to the drawings and particularly to FIG. 1, there is shown a toy clock according to the invention, the clock having a housing 10 and including a base 12 adapted to be placed on a surface to maintain the housing 10 in a vertical position. The housing 10 is provided with an integrally formed vertical surface 14 having suitably imprinted thereon the face 16 of a clock. Centrally disposed in conventional fashion with respect to the face 16 of the clock is a handle 18 adapted for rotating an hour hand 20 and a minute hand 22 in proportional relation. Disposed immediately beneath the face 16 of the clock is a window 24 through which a digital readout corresponding to the dial positions is provided.

Extending generally perpendicular to the surface 14, a plurality of track segments 25, 26, 27, 28 and 29 are provided with the lower portion of the housing 10 having a lower inclined track section 30 secured thereto. Each of the track segments is inclined to guide marbles under the force of gravity to the lower right-hand corner of the vertical surface 14 as viewed in FIG. 1, this corner being provided with an aperture 32 which is in communication with the portion or compartment of the housing 10 formed rearwardly of the vertical surface 14. As viewed in FIG. 1, the upper left-hand corner is provided with another aperture 34 through which marbles are transported on to the first track segment 26 for operation under the force of gravity downwardly.

Figure 4:
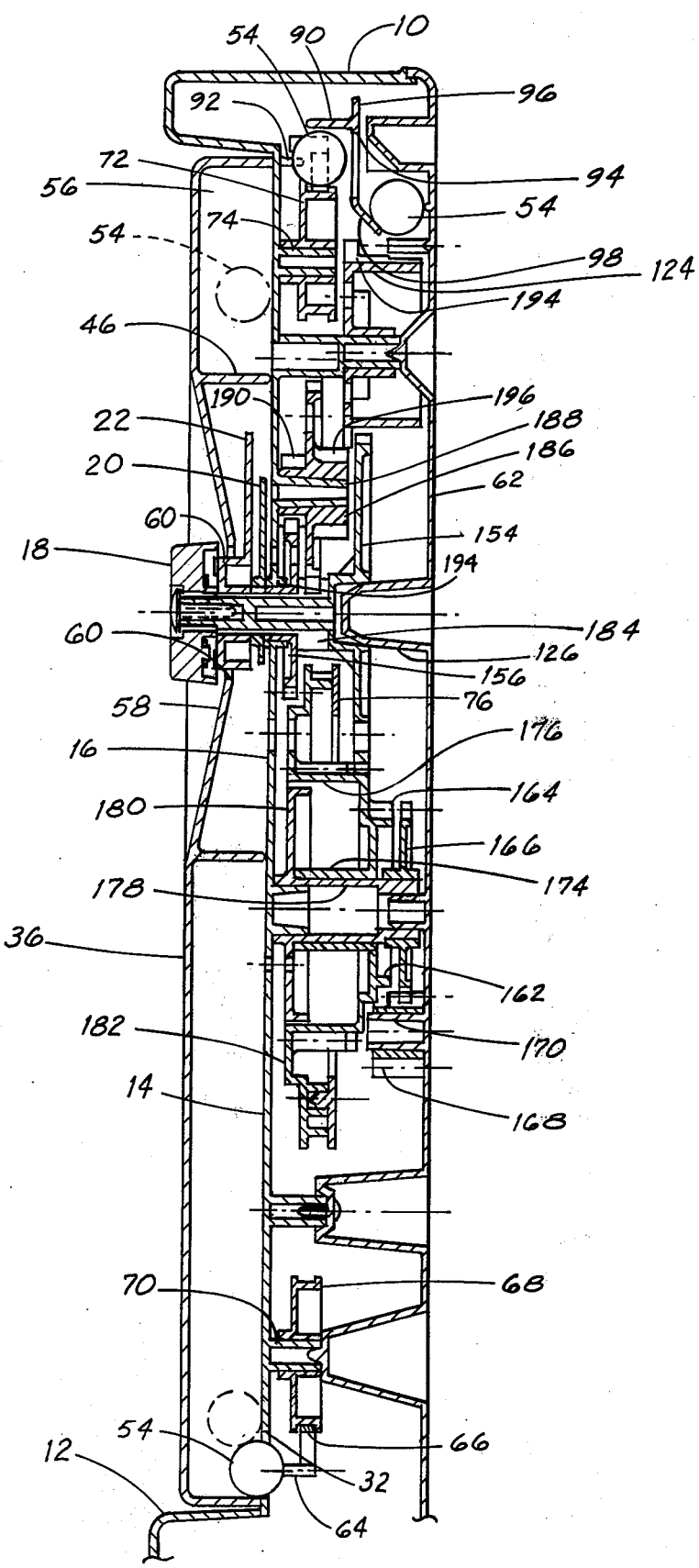
FIG. 4 is a cross-sectional view of the clock taken along broken line 4—4 of FIG. 3.

As better illustrated in FIG. 4, the vertical surface 14 is recessed with respect to the outer edges of the housing 10, and this recess is then covered with a transparent generally planar cover 36 which is in generally parallel relation with the surface 14, the spacing therebetween being slightly greater than the diameter of the marbles to be used with the clock. The cover 36 assists the track segments in guiding the marbles downwardly. Referring again to FIG. 1 as stated the track segments are inclined and at the lower end of the track segments, pivotally mounted to the vertical surface 14, a plurality of figures 38, 40, 42 and 44 are provided, with at least a portion of the lower end of each figure being positioned with respect to the adjacent track segment in such a location to be contacted by a marble traversing the trackways so-formed. The impact of the marble striking the figure results in a rocking or animated action of the figure.

The outer periphery of the face 16 is suitably protected from the path of travel of the marbles by means of a cylindrical flange 46 (see FIG. 4) integrally formed on the interior surface of cover 36, the flange 46 assisting in directing marbles traversing the trackway.

For example, the figure 38 is provided with a basket 39 in the path of travel of a marble dropping from the lower end of track segment 26, this action thereby rotating the figure 38 clockwise to the dotted line position as shown in FIG. 1. As will hereinafter be discussed figure 38 is part of a release escapement mechanism. Each of the other figures is provided with a horizontal pivot in the rear surface thereof at the approximate center thereof. Similarly, the figure 40 is adapted to be contacted and pivoted by a marble leaving the track segment 27 as is the figure 42 adapted to be pivoted by a marble leaving the track segment 28.

The lowermost figure 44 is configured in the form of a dog holding a hammer 4, the pivoting of the dog 44 in the direction shown by the arrow to simulate the hammer 48 contacting a bell member 50. The bell 50 is sounded as a marble 54 traverses the track segment 29 which has an arcuate lower end to direct the marble toward the bell 50 (as shown in dotted lines). As the marble reaches track segment 25, it is directed toward figure 44 to thereby pivot it. As will hereinafter be discussed, when the hour hand 20 is aligned with respect to a particular number and the minute hand 22 is generally vertical marbles can be released through aperture 34 by means of release lever 52 adjacent thereto, thereby permitting a number of marbles corresponding to the hour to traverse the trackway. As each of the so-released marbles leaves the track 29, the bell member 50 will be sounded one time for each marble thereby resulting in an audible signal corresponding to the number of marbles so-released and further corresponding to the hour shown on the clock face 16. Consequently it can be seen that the marbles traversing the trackway will provide a source of amusement as well as the animation of each of the figures when intercepted by a marble with the sounding of the bell 50 providing an audible indication of the hour. In addition, the time displayed in the window 24 provides a visual indication corresponding to the time shown by hands.

Prior to a detailed description of the construction of the toy clock, a brief discussion of the operation will be provided. With the housing 10 in a vertical position with the base 12 placed on a suitable surface such as a table or the like the surface 14 is vertical and each of the track segments 25–30 is downwardly inclined to provide a path of travel for a marble leaving aperture 34 until one or more marbles 54 are located on the lowest track segment 30 to serially pass through the aperture 32 at the lowermost location of track segment 30. As shown in FIG. 1 five marbles 54 are illustrated, corresponding to the time shown on the clock face 16 as well as digitally displayed in the window 24, the time indicated being 5 o'clock.

To operate the clock the handle 18 is grasped and rotated in a clockwise direction to move the minute hand 22 one full revolution per one numerical incrementing of the hour hand 20, this proportional coupling being effected as will hereinafter be described by appropriate gearing. Also as will hereinafter be described the handle 18 is provided with a unidirectional clutch to prevent any movement of the hands during rotation in the counterclockwise direction. Rotation of the handle 18 in the proper direction, through gears and belts, accomplishes three separate functions, one function being to rotate a pair of concentric co-planar surfaces which provide the digital readout in window 24; a second function being to operate a conveyor means in the rear compartment of the housing 10, the conveyor means communicating with the aperture 32; and the third function being to pre-select, on a storage rack adapted to communicate with aperture 34, a number of marbles for release through aperture 34, the number of marbles so-selected corresponding to the numeral pointed to by the hour hand 20. The release lever 52 serves to sequentially release the so-selected marbles through the aperture 34 with the release lever 52 having a portion thereof so configured that release of the marbles is inhibited until the minute hand 22 is generally vertical, that is within a few degrees on either side of the numeral twelve on the clock face 16.

Now referring to FIGS. 2 and 3 the components associated with each function will now be described. FIG. 3 is essentially a layout of the components as viewed from the front illustrating the position and interrelationship of the various components, with the reference numerals in FIG. 3 corresponding to the like component in the other figures.

Also, referring to FIG. 4, in vertical cross section, the housing 10 is basically divided into a front compartment 56 defined by the vertical surface 14 and the spaced parallel cover 36, the cover 36 being suitably indented at 58 with a central aperture 60 therein, the indented portion 58 being generally defined by the cylindrical flange 46 with the aperture 68 receiving a clutch mechanism 60 to which the handle 18 is secured. The second portion of the housing 10 is a rear compartment defined by the rear surface of the vertical surface 14 and a spaced parallel transparent rear cover 62. Although the rear cover 62 need not be transparent, the transparent nature of the cover 62 enables additional amusement value, as well as educational value, for a child using the clock. A child is thus able to view the working components of the clock to obtain an appreciation for mechanical objects. Additionally, the components may be molded in various colors to enhance the attraction to a child. For ease of illustration, in FIG. 4 the various track segments and animated figures have been removed and marbles 54 have been shown in various positions to illustrate the travel of the marbles 54 from the front compartment through the rear compartment to the top of the rear compartment and thus outwardly to traverse the front compartment under the force of gravity. At the lowermost end of the front compartment 56 adjacent aperture 32 a marble 54 is shown abutting against a finger 64 of a flexible continuous loop conveyor belt 66 which is received about a portion of the surface of an idler spool or drum 68 rotatably coupled about a shaft 70 integrally formed within the rear surface of vertical surface 14. A similarly configured spool or drum 72 is rotatably coupled about an axis 74 integral with the rear side of surface 14 adjacent the upper end thereof. As better illustrated in FIGS. 2 and 3, the conveyor belt 66, which is made of a flexible and elastic plastic material is a continuous loop encircling the drum 68, the drum 72 and a larger diameter drive drum 76, the surfaces of each of the drums having a plurality of transversely extending serrations 78 spaced equidistant about the periphery of the drum for engagement with mating ridges 80 extending transversely across the width of conveyor belt 66 with equal spacing corresponding to the spacing between serrations 78 to thereby effect a positive coupling between the drums 68, 72 and 76 with the inner surface of conveyor belt 66.

As best illustrated diagramatically in FIG. 3, the fingers 64 extending outwardly from the opposite surface of conveyor belt 66 are flexible and generally L-shaped with the spacing therebetween being equal and of a distance sufficient to permit a marble 54 to be gripped therebetween. Viewing the lower right-hand corner of FIG. 3, a marble 54 is shown in alignment with aperture 32 and with adjacent fingers 64 of conveyor belt 66 suitably spread due to the curving about idler spool 68 the marble 54 is permitted to pass from the front compartment 56 through the aperture 32 to a given location defined by a curved wall portion 84 formed integrally with the rear of vertical surface 14. The marble 54 is thus permitted to pass into the rear compartment between the so-spread fingers 64 of conveyor belt 66. With rotation of the idler spool 68 in the direction indicated by the arrow thereon, the conveyor belt moves from left to right as viewed in FIG. 3 thereby moving the marble 54 upwardly within a passageway 86 which is vertically displaced and defined by an adjacent side 88 of housing 10 which is in parallel relation with the conveyor belt 66 between idler spool 68 and idler spool or drum 72 adjacent the upper right-hand corner of housing 10 as viewed in FIG. 3. The passageway 86 is defined on the other two sides by the rear of vertical surface 14 and by a partition 90 (see FIG. 2) suitably secured in parallel relation to the rear of vertical surface 14. The spacing within passageway 86 is such that the marbles 54 are captively retained between adjacent fingers 64 of the conveyor belt 66 to be elevated to a position adjacent idler drum 72. Adjacent idler drum 72 the passageway 86 terminates adjacent a second curved wall 90. Positioned in the path of travel of a marble 54 adjacent curved wall 90 is a cammed edge or ramp 92 (see the upper end of FIG. 4) which ejects the marble 54 from the conveyor belt 66 through an aperture 94 formed in a vertically extending partition 96 adjacent thereto, the marble 54 then being directed down a ramp 98 formed in the lower edge of vertical partition 96 to a marble storage area generally designated 100 (see FIG. 2), the marble storage area 100 retaining the row of marbles 54 on an incline in the upper end of the rear compartment of housing 10 as shown in FIG. 3.

Figure 2:
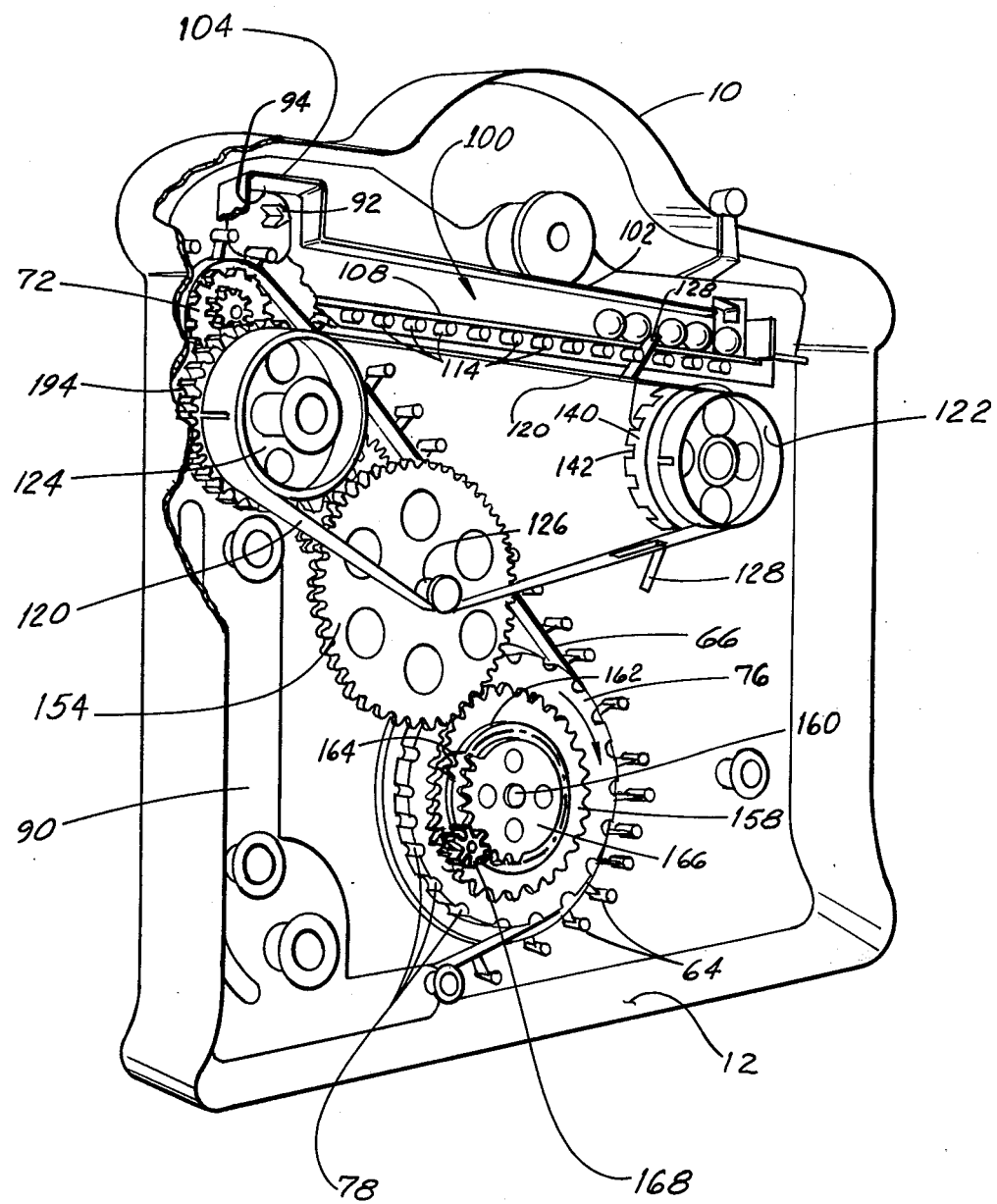
FIG. 2 is a rear perspective view of the clock of FIG. 1.
Figure 3:
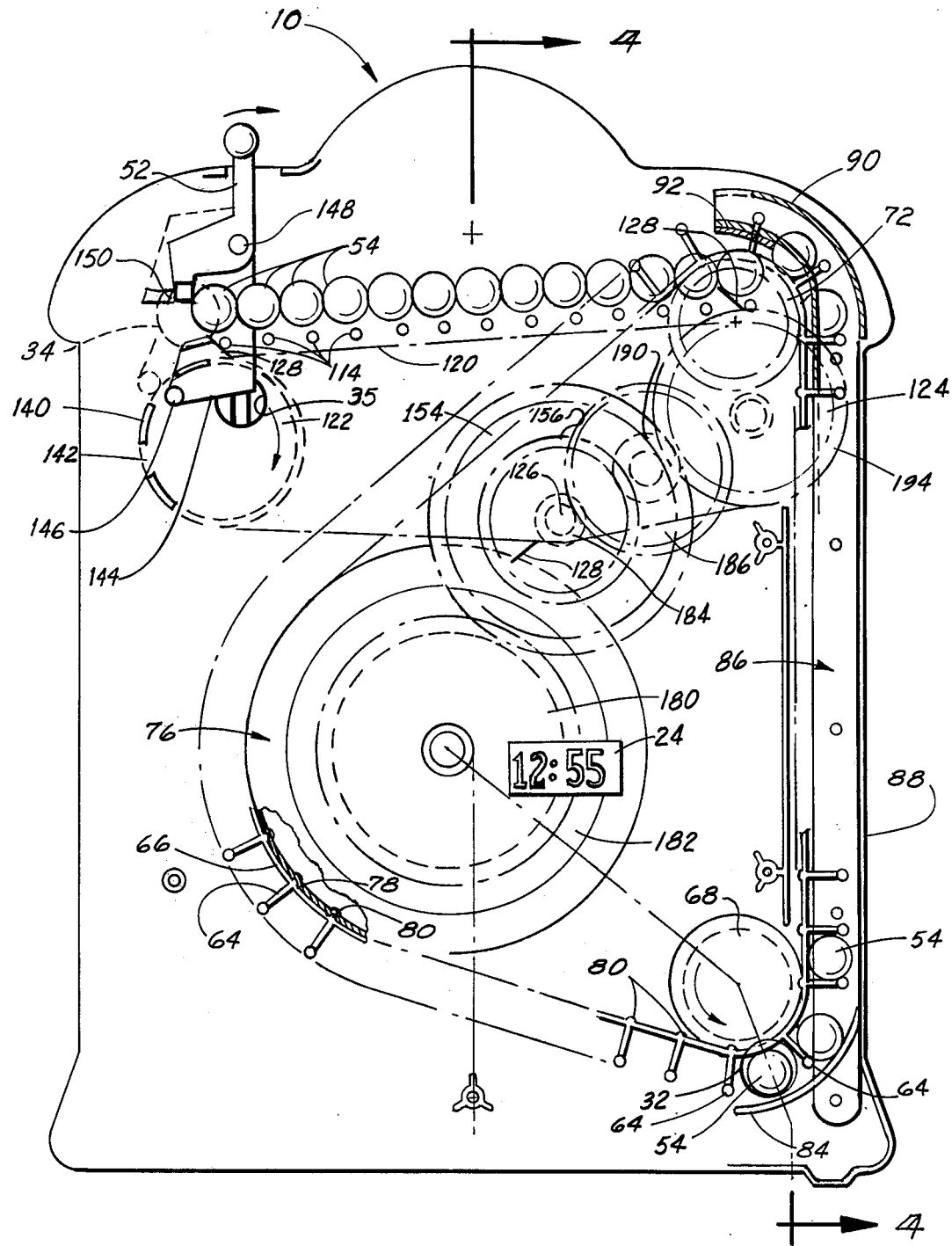
FIG. 3 is a front diagrammatic view illustrating the layout of basic components of the clock.
Figure 5:
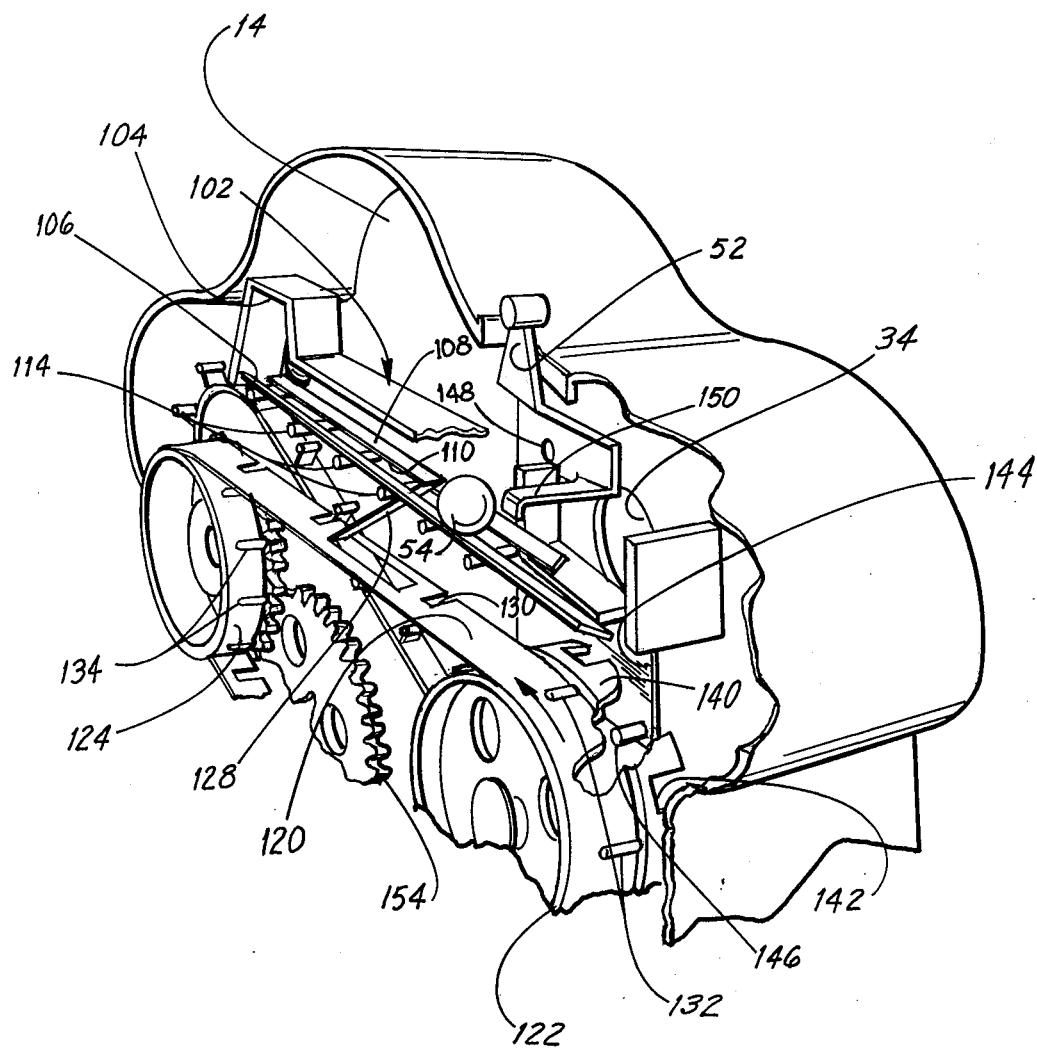
FIG. 5 is a rear perspective view of the upper portion of the rear compartment of the clock.

The marble storage area 100 is better illustrated in FIGS. 2 and 5 with the position thereof shown in the layout diagram of FIG. 3. Positioned transversely within the rear compartment of housing 10 is a unit 102 forming an elongated storage area having a vertically extending opening 104 communicating with aperture 94 with the other end thereof terminating adjacent aperture 34 through which the marbles are released to the front compartment. The unit 102 extends generally perpendicularly to the rear of vertical surface 14 with the lower edge thereof being configured to provide separated parallel chute segments 106 and 108 with an intervening longitudinally extending slot 110, the segment 106 extending beyond the edge of segment 108 adjacent aperture 34 and being inclined toward aperture 34 to direct the marbles 54 for release therethrough. The unit 102 is positioned in proximate relation to a plurality of outwardly extending equally spaced projections 114, the distance between adjacent projections 114 being essentially the diameter of a marble 54. The projections 114 adjacent slot 110 forms a ladder-like structure with the rungs or projections 114 extending perpendicular to the direction of the slot 110, thus forming a storage rack within the marble storage area 100. As better illustrated in FIG. 3, the marble storage area 100 is configured with the number of projections 114 generally corresponding to the number of marbles 54 capable of being stored in the marble storage area 100. As illustrated, there are 13 marbles 54 within the marble storage area, the unit being designed to release no more than 12, although 14 marbles are provided so that after the marbles are released at 11 o'clock, there will be 12 marbles ready for release after rotation of the clock hands to read 12 o'clock. The conveyor belt 66, as will hereinafter be discussed, is dimensioned to elevate marbles within adjacent openings between fingers 64 of the belt 66 so that all the marbles on track segment 30 are elevated to the storage area 100 during one complete revolution of the minute hand 22.

The number of marbles selected for release is determined by a marble selector mechanism which includes a continuous loop marble selector belt 120 looped about the periphery of a first drum portion 122, a second drum portion 124 and an idler extension 126. The spacing and positioning of drums 122 and 124 is such to maintain a portion of the marble selector belt 120 in proximate spaced parallel relation to the ladder rung formed by projections 114.

As best illustrated in FIG. 5, the belt 120, which is formed of a band of spring steel, is provided with a plurality of resilient outwardly extending deformable tangs 128, which in the normally extended position shown in FIG. 5 has the free end thereof extending between adjacent projections 114 through slot 110 a distance sufficient to retain marbles on the chute formed by segments 106 and 108 between the tang 128 and the end 104 of unit 102 which is the entrance end of the chute. The tang 128 is formed by cutting and bending a portion of the marble selector belt 120 to displace the tang 128 upwardly at an angle to the surface of belt 120. As illustrated in FIG. 3, the periphery of the belt 120 is provided with three tangs 128 equally spaced with the distance between adjacent tangs 128 being that necessary to define a length equal to the overall length of twelve adjacent marbles 54 when positioned end-to-end.

As better illustrated in FIG. 5, the marble selector belt 120 is provided with a plurality of inwardly extending slots 130 extending partway transversely across the belt 120, the slots 130 being equally spaced for engagement with outwardly extending ridges 132 formed about the periphery of drum 122 with similar ridges 134 formed about the periphery of drum 124. Due to the precise positioning requirement for the tang 128 during the marble selection process, the marble selector belt 120 is configured to be in a non-slipping relation with each of the drums 122 and 124. The spacing of the idler shaft 126 is such as to take up the slack as well as to provide tension for the belt 120 during movement thereof in the direction indicated by the arrow on belt 120 adjacent drum 122. As the marble selector belt 120 is moved in the direction indicated by the arrow the tang 128 is deformed or deflected downwardly toward the surface of belt 120 until the free end of tang 128 clears the next projection 114 in the path of travel thereof. The movement of the tang 128 during the travel of the belt 120 is such that the tang 128 extends through the slot 110 in the position shown in FIG. 5 intermediate adjacent projections 114 when the minute hand 22 is generally vertical. Correspondingly, with a complete revolution of the minute hand 22 the tang 128 will be incremented one marble position to a point intermediate the next two projections 114 in the path of travel thereof.

As illustrated in FIGS. 2 and 5, the drum 122 has a skirt portion 140 which is crenelated or slotted with a plurality of slots 142 about the periphery of the skirt 140, there being exactly 12 slots 142 equally spaced about skirt 140. The release lever 52 is configured to have a downwardly extending flange portion 144 immediately behind the skirt 140, the flange 144 having an inwardly extending pin 146 normally positioned within the confines of the crenelated skirt 140. As the release lever 52 is pivoted about its pivot point 148, the marbles will be released only if a slot 142 is in position for the pin 146 to pass therethrough, this will only occur when the minute hand 22 is extending generally upright in proximate location to the digit 12 on the clock face 16. This is diagramatically shown in FIG. 3 wherein the drum 122, in plan view, has the periphery thereof illustrated as arcuate segments resulting from the slots 142 within the skirt 140, and depicting the position of the pin 146 with respect to the slots. Only when a slot 142 is aligned with an arc having a radius between pivot 148 and pin 146 can the pin 146 pass therethrough to the dotted line position indicated. As also depicted diagramatically the release lever 52 is provided with a release arm 150 extending transversely into the path of travel of marbles 54 positioned on the chute formed by segments 106 and 108, the arm 150 in its normal position preventing release of any marbles 54 through the aperture 34 shown in dotted lines (see also FIGS. 2 and 5). As the release lever 52, as shown in FIG. 3, is pivoted in the direction indicated by the arrow adjacent thereto to the dotted line position the release arm 150 is rotated clockwise to position the first marble for release. As will hereinafter be discussed, as the lever 52 is allowed to return to the solid line position, the first marble will be released, with the rest of the marbles being sequentially released by an escapement mechanism, which includes the release lever 52. The number of marbles so-released would be determined by the position of tang 128 within the ladder network between adjacent projections 114. Although in FIG. 3 the tang 128 is shown just prior to the first marble ordinarily the slots 142 of the skirt 140 would not be aligned with the pin 146 until an additional increment of movement of marble selector belt 120 is reached. The position of the tang 128 with respect to the selector lever 52 and the crenelated skirt 140 is shown merely for illustrative purposes. However, once a slot 142 of the crenelated skirt 140 is aligned to permit pivoting of the release lever 52, the number of marbles down the incline in advance of the tang 128 will be released in sequence with the release lever 52 of the escapement mechanism providing a time interval between each released marble. The release lever 52, with a large mass below the pivot 148 thereof tends to rock back to its normal position under the force of gravity, but is rotated clockwise under the impact of each succeeding marble 54, on the animated figure 38, thus enabling the marbles 54 to traverse the track segments 25–30 in intermittent fashion to enable each marble so-released to pivot the animated figures and also provide discrete audible sounds when a marble 54 strikes the bell 50 as it leaves track segment 29. Thus a child is able to count each marble as released or alternatively to count each sound of the bell 50 as it is struck. Furthermore, the marble so-released will be retained on the bottom track segment 30 so that a child could likewise count the number of marbles 54 on track 30 prior to again rotating handle 18 to a new position.

The drive mechanism is provided with a plurality of gears which provide the proportional rotational relationship required of all the parts. Referrng to FIGS. 2–4, the handle 18 through clutch mechanism 60 is direct coupled to a main gear 154 of relatively large diameter, the main gear 154 being coupled to the axis of idler shaft 126. Coaxially disposed on the same shaft 126 is an intermediate gear 156 of a smaller diameter. The main drive gear 154 meshes with a large diameter gear portion 158 integral with drive drum 76 which is rotatably mounted on the shaft 160. The drive drum 76 is also provided with an integral disc portion 162 having a single pair of gearteeth 164 formed therein.

Also secured for rotation with respect to shaft 160 is a smaller diameter gear 166 which is adapted to mesh with a mutilated gear 168 secured for rotation about a shaft 170 integral with the rear cover 62 (see FIG. 4). Although the mutilated gear 168 is illustrated in FIG. 2, it is depicted in its position with respect to gear 166 in its relative position for illustrative purposes. The mutilated gear 168 is in the nature of a pinion with alternate teeth being foreshortened so as not to be engaged by the gearteeth pair 164 during rotation of the drive drum 76. The diameters, number of teeth, and number of foreshortened teeth of the respective gear members 168 and 166 with respect to the gearteeth pair 164 are preselected to provide a 12 to 1 reduction, this corresponding to the normal 12 to 1 ratio between the hour hand 20 and the minute hand 22 of the clock face 16. The number of teeth in the gear 166 is three times the number of teeth coacting therewith in the pinion 168 to provide a 3 to 1 ratio. The mutilated gear is provided with four long teeth extending transversely thereacross with the gearteeth pair 164 intercepting each of the teeth to rotate the gear 168 one-quarter revolution for each revolution of the drive drum 76, thereby resulting in a 4 to 1 ratio.

Referring particularly to FIG. 4, this 12 to 1 ratio drives the co-planar surfaces which result in the digital display of the time in viewing window 24. As illustrated in FIG. 4, the drive drum member 76 is provided with a hub 174 which is formed within a cylindrical recess 176, the hub 174 rotatably fitting over the hub 178 of a disc member 180, the face of the disc 180 having the numerals 1 through 12 imprinted thereon in equal angular relation and in proper alignment for display in the viewing window 24. Co-planar with the disc 180 is an annular disc portion 182 of the drive drum member 76, the annular surface 182 having printed thereon in equal angular relationship numerals corresponding to 5 minute increments of digital readouts to complete the digital readout within display window 24. Consequently, the co-planar surfaces 180 and 182 must be revolved in a 12 to 1 ratio to effect the proper readout. For this purpose, the hub 178 is fixed for rotation with respect to gear member 166 which is suitably secured thereto while the drive drum member 76 is rotatably about the hub 178 in proportion thereto based on the coupling between the two members provided by the mutilated gear 168. The rotation of the drive drum 76 is effected by rotation of the main gear 154 by rotating the handle 18.

The 12 to 1 ratio between the hour hand 20 and minute hand 22 is effected in a similar fashion. The hub of main gear 154 is elongated and is provided with a pinion portion 184 which engages an intermediate gear 186 rotatably coupled to a shaft 188 extending rearwardly from the vertical surface 14. Integral with gear member 186 in a pinion 190 intermediate the larger diameter gear 186 and the surface 14, the pinion 190 engaging a gear 192 having a hub portion 194 to which the hour hand 20 is affixed for rotation therewith. With the mounting of the concentric hubs in this fashion a complete revolution of the minute hand 22 will couple the pinion 184 for rotation through larger diameter gear 186 through the pinion 190 thereof to rotate the gear 156 coupled for rotation with respect to the hour hand 90 to effect 1/12th of a revolution of the hour hand 20 per full revolution of the minute hand 22.

To maintain the proper alignment between the marble selector belt 120 the drive drum 124 thereof is positively coupled by means of a gear portion 194 formed integrally therewith coupling with a pinion gear portion 196 of the gear member 86 to maintain the proper alignment of the driving components. Again the ratios of the diameters of the interconnecting gear portions is selected to increment the marble selector belt 120 one space for each 1/12th rotation of the hour hand 20 with the parts being so-aligned that the tang 120 is intermediate adjacent projections 114 in the marble storage area 100 when the minute hand 22 is generally directed upwards. The diameter of drive drum 76 and the coupling thereof for movement of conveyor 66 is so-selected that the conveyor 66, during one complete revolution of the minute hand 22, will convey all marbles to the marble storage area 100, at least 11 marbles corresponding to the worst case situation, when a child has already released 11 marbles for 11 o'clock and then rotates the dial to display 12 o'clock at which time at least 12 marbles must be in position within the marble storage area 100 to be released for proper functioning. As a result, the 11 marbles at the bottom of the compartment 56 will have to be conveyed by the conveyor 66 to the marble storage area 100 on one complete revolution of the minute hand 22 which would correspond to the incrementing of the hour hand 20 from the numerals eleven to the numeral 12 on the clock face 16. To allow a suitable margin for proper functioning, 14 marbles 54 would be included in the clock with the excess marbles being retained on the storage rack or by the space between adjacent fingers 64 of the conveyor belt 66.

Figure 6:
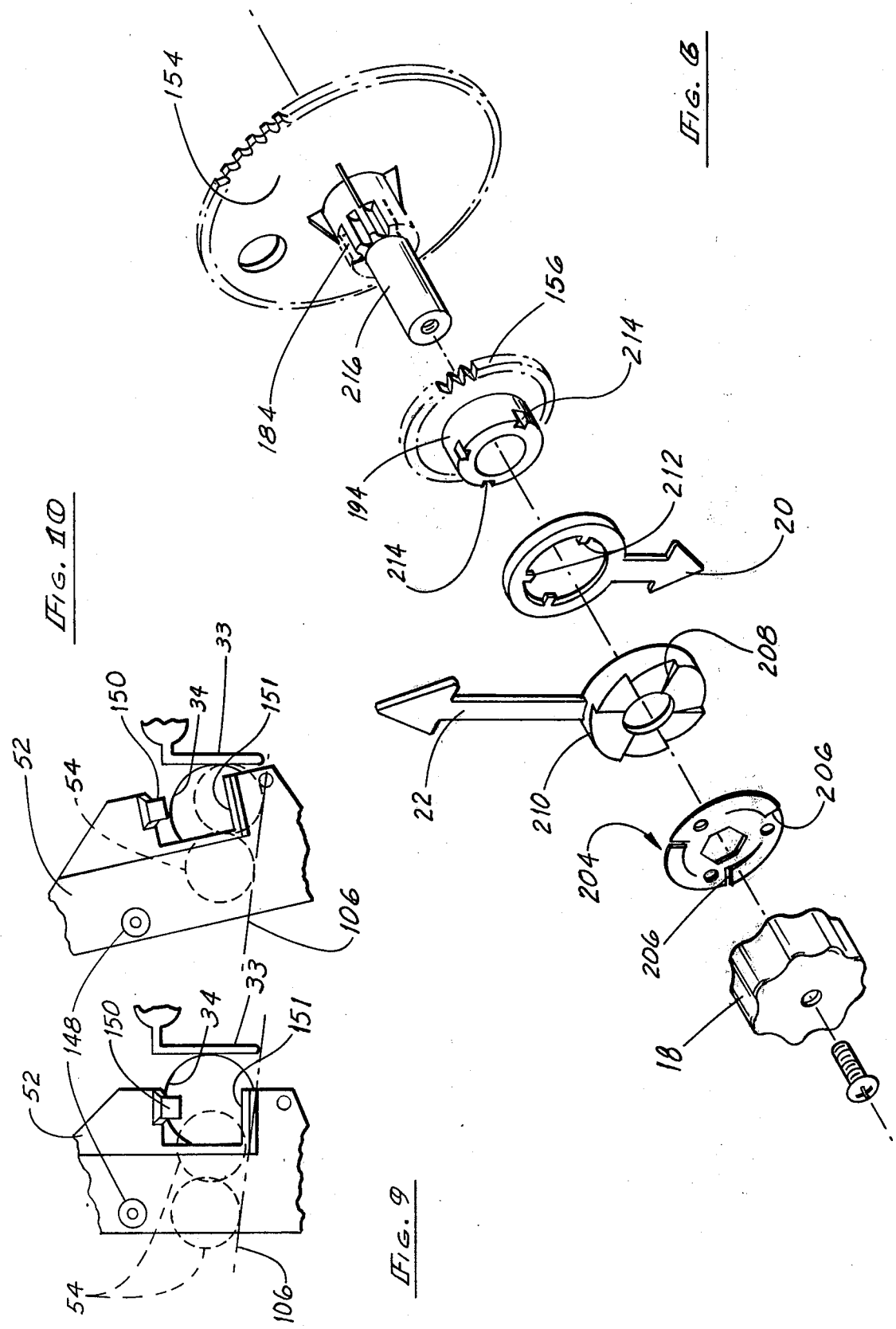
FIG. 6 is an exploded perspective view of the clock dial assembly.

In order to further safeguard the unit, as depicted in FIG. 6, the clock hands 18 are assembled to the main gear 154 by means of a suitable one-way spring clutch mechanism which includes a spring washer 204 having a plurality of deformable circumferentially positioned fingers 206 adapted to coact with a sawtooth peripheral surface 208 of the main body portion 210 of the minute hand 22. The hour hand 20 is provided with inwardly extending tabs 212 which fixedly engage suitable detents 214 in the hub 194 of the gear member 156 which rotates the hour hand 20, the hub 194 having an enlarged aperture extending in rotatable relation over shaft 216 to main drive gear 154. The washer 204 coacting with the surface 208 of minute hand 22 is positioned between the handle 18 and the main body 210 of minute hand 22, the washer 204 rotating concurrently with handle 18 and being configured to rotate minute hand 22 only in the clockwise direction. If the handle 18 is rotated in the counterclockwise direction, the fingers 206 will slide over the surface 208 thereby rendering such rotation ineffective to move main gear 154.

As a result of the construction hereinabove described, rotation of the handle 18 in the clockwise direction will displace the minute hand 22 with respect to the hour hand 20 in proportional clock relation with a simultaneous rotation of the concentric surfaces 180 and 182 to provide a digital readout in the viewing window 24 corresponding to the time then displayed by the hands of the clock. Simultaneously, this rotation of handle 18 will operate the conveyor belt 66 to elevate marbles to the marble storage area 100 and the marble selector belt 120 will likewise be incremented with respect to the marble storage area 100 a distance to permit release of only the number of marbles 54 corresponding to the position of the hour hand 20. Furthermore, due to the construction of the release lever 52 release of the preselected number of marbles 54 will be inhibited until such time as slot 142 of the crenelated skirt 140 adjacent thereto is in alignment for passign therethrough of the pin 146 of the release lever 52, this position corresponding to the tang 128 of the marble selector belt 120 being at a position intermediate adjacent projections 114 and further corresponding to a generally upright position of minute hand 22 adjacent the numeral 12 of the clock face 16.

Figure 7:
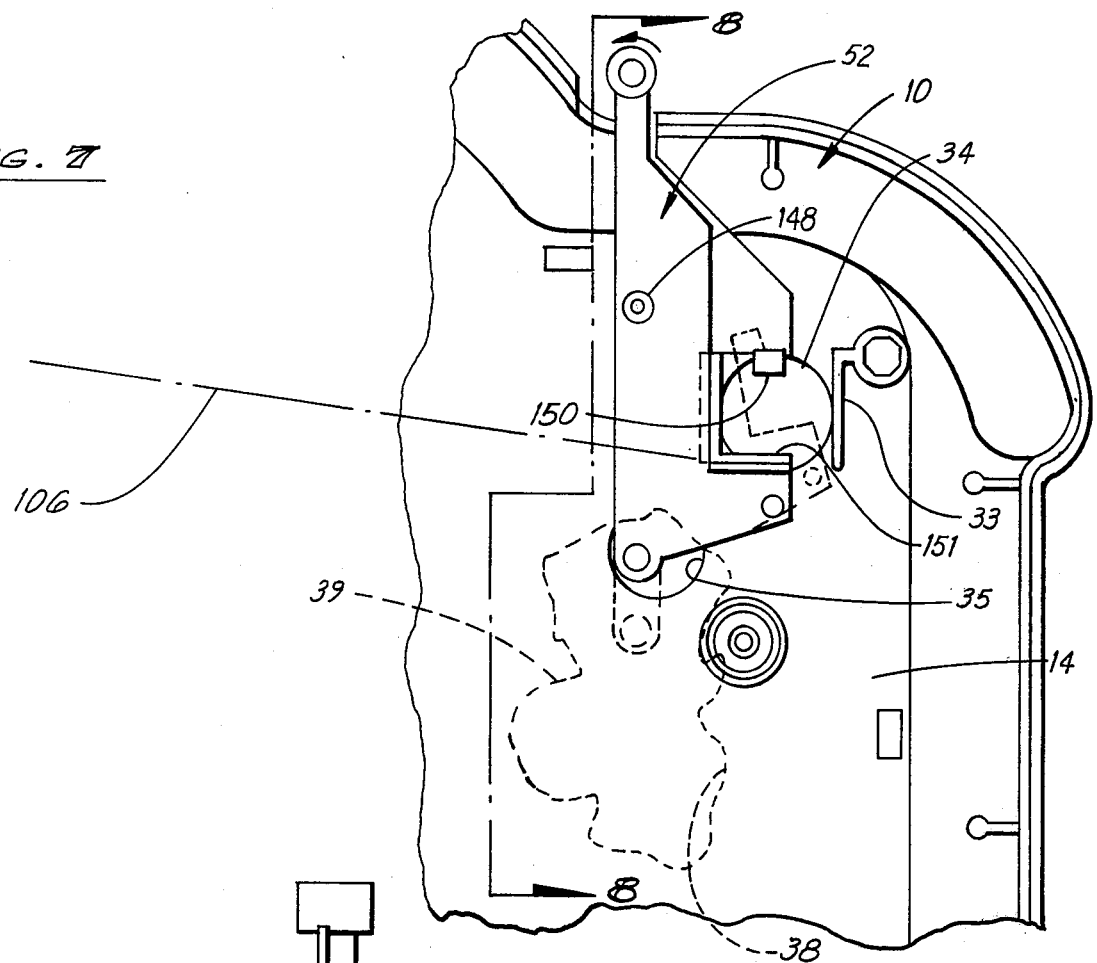
FIG. 7 is a partial rear view with components removed to illustrate the escapement release mechanism.

Referring now to FIGS. 7-10, the details pertaining to the marble rlease mechanism will be discussed. The marble release mechanism is essentially a tuned escapement mechanism which permits the marbles 54 to sequentially advance from the marble storage area 100 through the aperture 34 into the front compartment 56. As can be seen in FIG. 7, the release lever 52 is pivotable about pivot point 148, and in the solid line position shown the release lever arm 150 extends generally perpendicular to the circumference of aperture 34 along a line to the left of center of the aperture 34. Formed in the rear part of housing 10 is a wall portion 33 tangential to the circumference of aperture 34 and perpendicular to the vertical wall 14 of housing 10. The release lever 52 is configured, so that in its normally suspended position shown in solid lines in FIG. 7, the C-shaped opening or jaw 151 thereof is in general alignment with a portion of aperture 34 with the arm 150 restraining marbles therebehind. The broken line designated 106 and downwardly inclined toward aperture 34 illustrates the angular orientation of the chute segments 106 and 108 and provides a reference for the chute 106 with respect to aperture 34.

Figure 8:
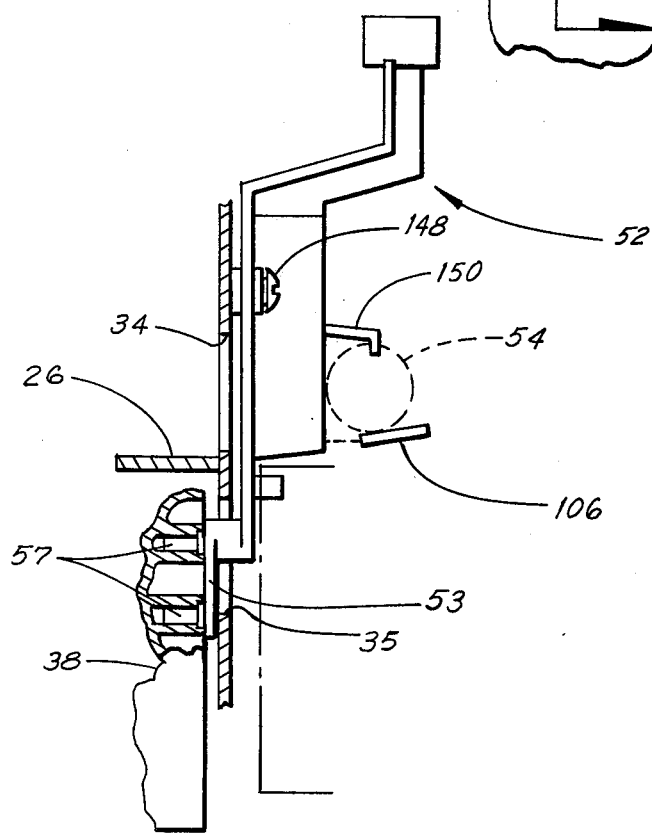
FIG. 8 is an end view, partially in cross section, as viewed generally along line 8—8 of FIG. 7.

Downwardly depending from the lower edge of release arm 52 and offset therefrom (see also FIG. 8) is a segment 53 which has a pair of parallel pins 57 extending outwardly therefrom and into compartment 56 for engagement by suitably mating apertures in the rear surface of the uppermost figure 38 shown in FIG. 1. As shown in FIGS. 7 and 8, the offset of segment 53 passes through an enlarged aperture 35 formed in the vertical surface 14 with the animated FIG. 38 being carried by the release arm 52, and pivotal therewith in the front compartment 56. The FIG. 38 serves a dual purpose, one being to counterbalance the escapement mechanism formed by release lever 52 in conjunction with the FIG. 38, and the second purpose being to actuate the escapement mechanism upon release of the lever 52. As will be dicussed, the release lever 52 is pivoted in the direction of the arrow adjacent to the handle thereof until the jaws 151 are in the dotted line position shown in FIG. 7. The release lever 52 is then permitted to return under the force of gravity and the first marble is released through aperture 34. This marble, once released, traverses track segment 26 (see also FIG. 1) until it contacts wall 46 and then drops into contact with the simulated bucket 39 of FIG. 38 to thereby release a subsequent marble through aperture 34.

As shown in FIG. 8 (and also FIG. 5) the chute segment 106 extends beyond the terminal end of chute segment 108 and provides an inclined plane toward the jaw 151 to direct the marble 54, shown in dotted lines, onto the adjacent inclined surface of the lower edge of jaw 151 and out through aperture 34 to traverse track segment 26. For ease of illustration and explanation, the apertures 35 and 34 in FIG. 8 are both illustrated, although as shown in FIG. 7, the apertures 34 and 35 are offset with respect to one another. Referring now to FIGS. 9 and 10, the release of a marble 54 (shown in dotted lines) through aperture 34 will be discussed. As illustrated, two marbles 54 are shown in dotted lines in relation to the line of the chute segment 106, and as shown in FIG. 9 with the release lever 52 unpivoted the leading edge of release arm 150 abuts against the periphery of the first marble 54 to prevent its release. As release lever 52 is then pivoted in a counterclockwise direction to the position shown in FIG. 10, the first marble 54 is permitted to increment or advance down the incline 106 to abut against the wall 33 and as shown, the first marble 54 is in alignment for passage through aperture 34. However, due to the pivoting of the lower lip of jaw 151, the aperture 34 is partially blocked thereby retaining marble 54 on the inclined chute segment 106. As the lever 52 is released to thereby permit it to rotate, under the force of gravity, in a clockwise direction to the position shown in FIG. 9, the first marble 54 is released through aperture 34. As the release arm 150 rotates clockwise as viewed in FIG. 10 to its normal position, the dimensioning of the arm 150 is such that it immediately contacts the next marble 54 in sequence to inhibit or prevent the second marble 54 from being released through aperture 34. With the first marble 54 leaving aperture 34 it then traverses track segment 26 within the front compartment 56 (see FIG. 1) until at the terminal end of track segment 26 the marble then contacts the simulated bucket 39 of the animated FIG. 38 to thereby automatically pivot or increment the release lever 52 to the position shown in FIG. 10 thereby permitting the advance of a second marble 54 into the position shown therein. As the FIG. 38 then returns to its normal position along with, of course, release lever 52 the sequence repeats itself thereby enabling the second marble to be released and the third marble to be retained until subsequent impact of the second marble on the simulated bucket 39 causes release of a subsequent marble until all marbles permitted to be released have been released. The escapement mechanism thus formed provides a spaced time delay between the release of marbles which effectively enables each of the other animated FIGS. 40, 42 and 44 to return to its normal position subsequent to re-actuation by the next marble. Correspondingly, as each marble 54 leaves the upwardly inclined track segment 29 (see FIG. 1) to actuate the bell 50, the audible signals or "gongs" caused by the striking of the bell 50 will be in uniformly spaced time relation to simulate the sounding of the hour in a chime-type clock. As the marble then traverses the last track segment 25, the animated FIG. 44 carrying a hammer 48 will be pivoted to simulate the sounding of the bell 50 by the hammer 48, although in fact, the hammer 48 does not strike the bell 50.

Upon release of the marbles 54 through the aperture 34 by pivoting of the release lever 52, the marbles 54 so-selected traverse the track segments 26-30 to intermittently pivot or rock the other animated FIGS. 40, 42 and 44. As the marbles traverse the last track segment 25, the marbles so-released will remain on track segment 30 thereby providing a visual indication of the number adjacent the hour hand 20. The marbles will thus remain there until such time as the handle 18 is then rotated thereby manipulating in phased relation the conveyor belt 66, the marble selector belt 120 along with the co-planar surfaces 180 and 182.

While there has been shown and described a preferred embodiment, it is to be understood that various other adaptions and modifications may be made within the spirit and scope of the invention.

What is claimed is:

1. In a toy clock, the combination comprising:
a housing having a viewable surface adapted for vertical positioning;
means on said surface for indicating the time, said means having drive means coupled thereto for varying the time so-indicated;
means coupled adjacent said surface for guiding marbles from the top to the bottom thereof under the force of gravity;
means communicating with said guiding means adjacent the bottom of said surface for conveying said marbles to the top of said surface in response to actuation of said drive means;
means communicating with said conveyor means for retaining said marbles adjacent the top of said surface;
means operable by said drive means for selecting from said retaining means a number of marbles corresponding to the hour of the time so-indicated; and
an escapement mechanism for releasing sequentially the so-selected number of marbles at the top of said surface into communication with said guiding means, said escapement mechanism including a manually operable release lever and means adjacent said guiding means in the path of travel of said marbles thereon, said release lever being operable for releasing the first of the so-selected number of marbles, and subsequent marbles being released in response to impact of each marble traversing said guiding means and impacting with said means adjacent said guiding means.

2. The combination according to claim 1 wherein said housing further includes a transparent cover in spaced parallel relation with said viewable surface, said cover at least partially guiding said marbles from the top to the bottom of said surface.

3. The combination according to claim 2 wherein said drive means is a manually-rotatable handle coupled to said indicating means through said cover.

4. The combination according to claim 1 wherein said means adjacent said guiding means is an animated figure coupled to said escapement means.

5. The combination according to claim 4 wherein said animated figure is coupled to said release lever and said release lever has a release arm engaging each of the so-selected number of marbles to sequentially restrain each marble in turn until said animated figure is impacted by the preceding marble released.

6. The combination according to claim 5 wherein said housing has a compartment formed behind said surface and said conveyor means are positioned within said rear compartment.

7. The combination according to claim 6 wherein said housing includes a transparent cover in spaced parallel relation with said viewable surface to form a front compartment, said cover at least partially guiding said marbles.

8. The combination according to claim 7 wherein said guiding means include a trackway formed within said front compartment.

9. In a toy clock, the combination comprising:
a housing having a viewable surface adapted for vertical positioning and a compartment formed within said housing behind said surface;
means on said surface for indicating the time, said means having drive means coupled thereto for varying the time so-indicated;
a transparent cover secured to said housing in spaced parallel relation with said viewable surface to form a front compartment;
means coupled adjacent said surface for guiding marbles from the top to the bottom thereof under the force of gravity with said cover at least partially guiding said marbles, said guiding means including a trackway formed within said front compartment, said trackway including a plurality of discrete downwardly inclined track segments;
at least one figure pivotally mounted to said surface adjacent the lower end of one of said track segments in a position for pivoting in response to impact thereagainst of a marble traversing said track segment;
means communicating with said guiding means adjacent the bottom of said surface for conveying said marbles to the top of said surface in response to actuation of said drive means;
means communicating with said conveyor means for retaining said marbles adjacent the top of said surface;
means operable by said drive means for selecting from said retaining means a number of marbles corresponding to the hour of the time so-indicated; and
means for releasing the so-selected number of marbles at the top of said surface into communication with said guiding means.

10. The combination according to claim 9 wherein said means for indicating the time is a clock face having an hour hand and a minute hand and said drive means includes a manually-rotatable handle proportionally coupled to said hands to vary the time upon rotation thereof.

11. The combination according to claim 10 wherein said means for indicating the time also includes digital readout means viewable through an aperture in said surface, said digital readout means being operatively coupled to said hands for varying the readout of said digital means to correspond to the position of the hands.

12. The combination according to claim 11 wherein said release means includes means for rendering said release means inoperable until the position of the minute hand is directed generally upwards.

13. The combination according to claim 12 wherein said trackway and said surface is so-configured to retain the so-released marbles in a viewing position until said handle is further rotated.

14. The combination according to claim 13 wherein said conveyor means is a conveyor belt operatively coupled for movement with said handle to convey said marbles to said retaining means.

15. In a toy clock, the combination comprising:
a housing having a viewable front surface adapted for vertical positioning, said surface having a clock face thereon;
a transparent cover assembled to said housing in spaced parallel relation with said surface to form a front compartment, at least one of said surface and said cover forming track means within said compartment for conveying marbles from the top to the bottom thereof under the force of gravity;
a rear cover spaced from the rear of said surface and secured to said housing for forming a rear compartment;
an hour hand and a minute hand rotatably coupled to said surface through an aperture centrally disposed with respect to said clock face;
a manually-rotatable handle secured to said surface through said transparent cover;
means coupling said handle to said hands to vary the position thereof in proportional relation in response to rotation of said handle;
digital readout means including a rotatable disc and a concentric annular disc co-planar with with said first disc, each of said disc and annular disc member having indicia thereon for displaying through a viewing window in said front surface, said digital readout means being operatively coupled to said handle for providing a digital readout indicative of the time indicated by said hands on said clock face;
conveyor means secured to said housing within said rear compartment and having means communicating with the bottom of said front compartment said conveyor means being operatively coupled to said handle for conveying marbles from the bottom to the top of said rear compartment;
marble storage means within said rear compartment communicating with said conveyor means for receiving marbles therefrom;
marble selector means in operative relation with said marble storage means, said marble selector means being operative in response to rotation of said handle for pre-selecting a number of marbles corresponding to the position of said hour hand; and
means communicating with said marble storage means and said front compartment for sequentially releasing the so-selected marbles for transversing said track means under the force of gravity.

16. The combination according to claim 15 wherein said marble storage means includes a rack receiving said marbles and said marble selector means includes a belt having a portion thereof in spaced relation with said rack, said belt having a resilient tang member adapted to extend through the openings in said rack and to be deformed during movement between adjacent openings, said tang being adapted upon extending through an opening to retain all of the marbles from release but the so-selected group of marbles.

17. The combination according to claim 16 wherein said means for releasing said marbles includes a release lever, said release lever having a portion thereof operatively coupled to a pulley of said marble selector means to inhibit release of said marbles until said tang is within one of the openings of said rack.

18. The combination according to claim 17 wherein said track means includes a plurality of inclined track segments and said surface includes means adjacent one of said track segments for emitting an audible signal in response to passage of marbles traversing said track segment.

* * * * *